United States Patent
Linton et al.

(10) Patent No.: US 12,309,263 B2
(45) Date of Patent: May 20, 2025

(54) POST-QUANTUM CRYPTOGRAPHY SECURED EXECUTION ENVIRONMENTS FOR EDGE DEVICES

(71) Applicant: International Business Machines Corporation, Armonk, NY (US)

(72) Inventors: Jeb R. Linton, Manassas, VA (US); Samuel Matzek, Pine Island, MN (US); Siyamack Ghaeedan, Arlington Heights, IL (US); Kris Marie Murphy, Rochester, MN (US); Jeff McNeely, Princeton, TX (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 17/217,326

(22) Filed: Mar. 30, 2021

(65) Prior Publication Data

US 2022/0321332 A1  Oct. 6, 2022

(51) Int. Cl.
*H04L 9/08* (2006.01)
*G06F 21/60* (2013.01)
(Continued)

(52) U.S. Cl.
CPC .......... *H04L 9/0852* (2013.01); *G06F 21/602* (2013.01); *G06N 20/00* (2019.01); *H04L 9/3093* (2013.01)

(58) Field of Classification Search
CPC ................ H04L 9/0852; H04L 9/3093; H04L 2209/127; G06N 20/00; G06F 21/602
See application file for complete search history.

(56) References Cited

U.S. PATENT DOCUMENTS

2018/0375638 A1* 12/2018 Khanna ................. H04L 9/0894
2019/0042878 A1*  2/2019 Sheller ................. G06F 16/951
(Continued)

FOREIGN PATENT DOCUMENTS

| CN | 111931251 A | 11/2020 |
|---|---|---|
| CN | 112039670 A | 12/2020 |
| WO | 2022206183 A1 | 10/2022 |

OTHER PUBLICATIONS

Graviton: Trusted Execution Environments on GPUs Stavros Volos and Kapil Vaswani, Microsoft Research; Rodrigo Bruno, INESC-ID / IST, University of Lisbon (Year: 2018).*
(Continued)

*Primary Examiner* — Shewaye Gelagay
*Assistant Examiner* — Thomas A Carnes
(74) *Attorney, Agent, or Firm* — Aaron N. Pontikos (57) ABSTRACT

Disclosed are techniques for post-quantum encrypted trusted execution environments on edge devices. An edge computing device includes a trusted execution environment that encompasses at least some SIMD processing units such as Graphics Processing Units (GPUs). A data record, such as machine learning inferences from a machine learning or artificial intelligence model, is generated on the edge computing device within the trusted execution environment and encrypted with post-quantum encryption (such as lattice based encryption) using SIMD processing units in the trusted execution environment. Workloads received for the trusted execution environment, also encrypted with post-quantum encryption, are decrypted using the SIMD processing units in the trusted execution environment.

12 Claims, 4 Drawing Sheets

(51) Int. Cl.
  *G06N 20/00*   (2019.01)
  *H04L 9/30*    (2006.01)

(56) References Cited

U.S. PATENT DOCUMENTS

| | | | |
|---|---|---|---|
| 2019/0199695 A1 | 6/2019 | Bhardwaj | |
| 2019/0319804 A1 | 10/2019 | Mathew | |
| 2019/0332814 A1* | 10/2019 | Bos | G06F 21/64 |
| 2020/0082270 A1* | 3/2020 | Gu | G06N 5/045 |
| 2020/0134230 A1 | 4/2020 | Booth, Jr. | |
| 2020/0252198 A1* | 8/2020 | Nandakumar | G06N 3/084 |
| 2020/0403781 A1* | 12/2020 | Gentry | H04L 9/008 |
| 2021/0091934 A1* | 3/2021 | Fletcher | G06Q 20/389 |
| 2021/0117395 A1* | 4/2021 | Wang | G06N 20/00 |
| 2021/0152343 A1* | 5/2021 | Yu | H04L 63/0478 |
| 2022/0114249 A1* | 4/2022 | Grancharov | G06F 21/12 |

OTHER PUBLICATIONS

"The Clipper Chip", uploaded from the Internet on Mar. 1, 2021, 1 pp., Electronic Privacy Information Center, <https://epic.org/crypto/clipper/>.

Akleylek, S., et al., "Efficient arithmetic for lattice-based cryptography on GPU using the CUDA platform" Abstract, 2014 22nd Signal Processing and Communications Applications Conference (SIU), 2014, 4 pgs., Trabzon, Turkey, <https://ieeexplore.ieee.org/document/6830364>.

Badawi, A., et al., "Accelerating subset sum and lattice based public-key cryptosystems with multi-core CPUs and GPUs", Journal of Parallel and Distributed Computing, Sep. 2018, 12 pgs., vol. 119, <https://www.sciencedirect.com/science/article/abs/pii/S0743731518302831>.

Bai, T. et al., "Accelerating NTRU Encryption with Graphics Processing Units", International Journal of Networked and Distributed Computing, Oct. 2014, 9 pgs., vol. 2, No. 4, Arkansas State University, USA, <https://download.atlantis-press.com/article/14327.pdf>.

Choi, J. I. et al., "Secure Multiparty Computation and Trusted Hardware: Examining Adoption Challenges and Opportunities," Security and Communication Networks, 2019, 28 pages, <https://doi.org/10.1155/2019/1368905>.

Gollamudi et al., "Information Flow Control for Distributed TrustedExecution Environments", downloaded from the Internet on Mar. 1, 2021, 15 pps., <https:/people.seas.harvard.edu/~chong/pubs/csf19_dflate.pdf>.

Nejatollahi, H., et al., "CryptoPIM: In-memory Acceleration for Lattice-based Cryptographic Hardware", Jul. 2020, 2020 IEEE, 6 pgs., California, USA, <https://ieeexplore.ieee.org/document/9218730>.

Shepherd, "Techniques for Establishing Trust in Modern Constrained Sensing Platforms with Trusted Execution Environments", Doctoral Thesis, Jan. 17, 2019, 245 pps., <file:///Users/sg/Downloads/2019shepherdcphd.pdf>.

Tamrakar et al., "The Circle Game: Scalable Private Membership Test Using Trusted Hardware", 18 pps., Aug. 24, 2016, arxiv.org/pdf/1606.01655v3 [cs.CR].

International Search Report and Written Opinion, International Application No. PCT/CN2022/075978, International Filing Date Feb. 11, 2022.

* cited by examiner

POST-QUANTUM CRYPTOGRAPHY SECURED EXECUTION ENVIRONMENTS FOR EDGE DEVICES

BACKGROUND

The present invention relates generally to the field of trusted execution environments, and more particularly to graphics processing unit accelerated lattice encrypted trusted execution environments.

A trusted execution environment (TEE) is a secure computation compartment of a main processor. The purpose of a TEE is to guarantee code and data loaded inside to be protected with respect to confidentiality and integrity. A TEE as an isolated execution environment provides enhanced security features including isolated execution, integrity of applications executing within the TEE, as well as confidentiality of their assets. Stated alternatively, the TEE offers an execution space with a higher level of security for trusted applications running on a device with the TEE compared to a rich operating system (OS), with more functionality than a 'secure element' (SE).

A graphics processing unit (GPU) is a specialized electronic circuit designed to quickly manipulate and alter memory to accelerate generation of images in a frame buffer intended for output to a display device. GPUs are used in many types of devices, including embedded systems, mobile phones, personal computers, workstations, and game consoles. Many modern GPUs are highly efficient at manipulating computer graphics and image processing. Their highly parallel structure also makes them significantly more efficient than general-purpose central processing units (CPUs) for algorithms that process large blocks of data in parallel. In a personal computer, a GPU may be present on a discreet video card or embedded on the motherboard. Certain CPUs are designed such that the GPU is embedded on the CPU die.

Lattice-based cryptography describes constructions of cryptographic primitives that involve lattices, either in the construction itself or in the security proof. Lattice-based constructions are currently promising candidates for post-quantum cryptography. Unlike more broadly used and known public-key schemes such as the RSA, Diffie-Hellman or elliptic-curve cryptosystems, which could, theoretically, be easily overcome by a quantum computer, some lattice-based constructions appear to be resistant to attack by both classical and quantum types of computers. Furthermore, many lattice-based constructions are considered to be secure under the assumption that certain well-studied computational lattice problems cannot be efficiently solved.

Edge computing is a distributed computing paradigm that brings computation and data storage closer to the physical location where it is needed, in order to improve response times and save network bandwidth. The origins of edge computing lie with the content delivery networks (CDNs) that were created in the late 1990s to serve web and video content from edge servers that were deployed geographically close to users. In the early 2000s, these CDNs changed, now hosting applications and application components at the edge servers, which resulted in the first commercial edge computing services that hosted applications such as dealer locators, shopping carts, real-time data aggregators, and ad insertion engines. Modern edge computing further extends this approach through virtualization technologies that streamline the deployment and execution of a wider range of applications on the edge servers.

Artificial intelligence (AI) describes intelligence demonstrated by machines, unlike the natural intelligence displayed by humans and animals, which involves consciousness and emotionality. The distinction between the former and the latter categories is frequently revealed by the acronym chosen. 'Strong' AI is typically labelled as AGI (Artificial General Intelligence) while attempts to emulate 'natural' intelligence have been called ABI (Artificial Biological Intelligence). Prominent AI textbooks define the field as the study of "intelligent agents": any device that perceives its environment and engages in actions that maximize its chance of successfully achieving its goals. Colloquially, the term "artificial intelligence" is frequently used referring to machines (or computers) that imitate "cognitive" functions that humans associate with the human mind, such as "learning" and "problem solving." Modern machine capabilities typically classified as AI include successfully understanding human speech, competing at the highest level in strategic game systems (such as chess and Go), autonomously operating moving vehicles (such as cars, trucks, aquatic and airborne vessels), intelligent routing in content delivery networks, and military simulations.

In the field of mathematics, a tensor is an algebraic object which describes a (multilinear) relationship between sets of algebraic objects related to a vector space. The types of objects that tensors may map between include vectors, scalars, and even other tensors. Tensors may take several different forms—for example: scalars and vectors (which are the two simplest tensors), dual vectors, multilinear maps between vector spaces, and even some operations (for example, the dot product.)

SUMMARY

According to an aspect of the present invention, there is a method, computer program product and/or system for use with an edge computing device including a trusted execution environment encompassing at least some units of a set central processor units and at least some units of a set of accelerator units that performs the following operations (not necessarily in the following order): (i) generating, within the trusted execution environment, a data record for encryption; and (ii) encrypting, using the at least some units of the set of accelerator units, the data record with a post-quantum encryption scheme.

DETAILED DESCRIPTION

Some embodiments of the present invention are directed to techniques for post-quantum encrypted trusted execution environments on edge devices. An edge computing device includes a trusted execution environment that encompasses at least some SIMD processing units such as Graphics Processing Units (GPUs). A data record, such as machine learning inferences from a machine learning or artificial intelligence model, is generated on the edge computing device within the trusted execution environment and encrypted with post-quantum encryption (such as lattice based encryption) using SIMD processing units in the trusted execution environment. Workloads received for the trusted execution environment, also encrypted with post-quantum encryption, are decrypted using the SIMD processing units in the trusted execution environment.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
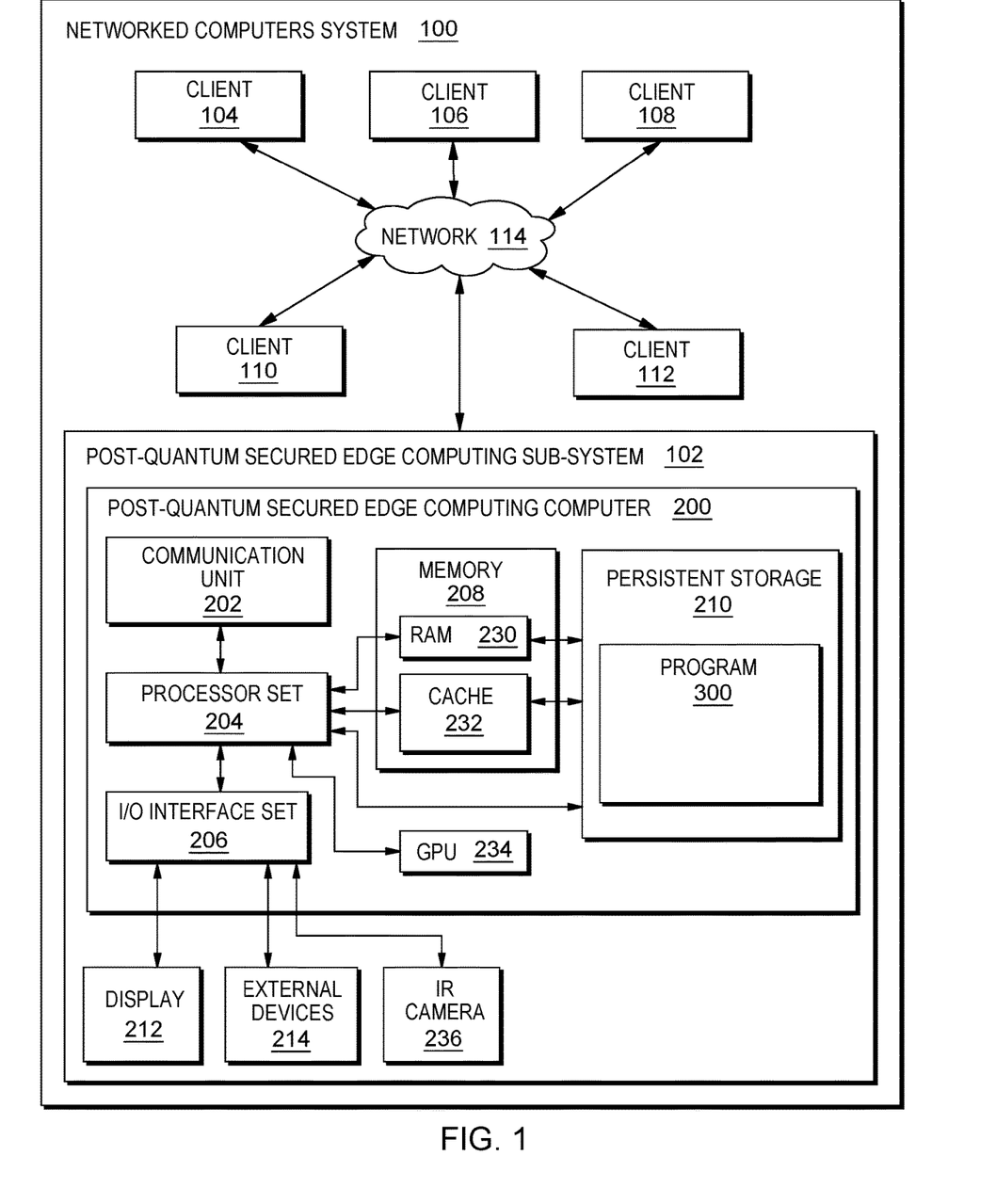
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: post-quantum secured edge computing subsystem 102 (sometimes herein referred to, more simply, as subsystem 102); client subsystems 104, 106, 108, 110, 112; and communication network 114. Server subsystem 102 includes: post-quantum secured edge computing computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with post-quantum secured edge computing computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

GPU 234 is a set of graphics processing unit(s). In some alternative embodiments, GPU 234 is a set of accelerator units similar to GPUs such that they specialized circuits of a highly parallel structure to perform parallel calculations with increased efficiency over more generalized computer processing units, such as operations concerning vectors and matrices.

IR camera 236 is an infrared camera, also known as a thermal imaging camera, that captures images using infrared radiation, revealing black body radiation emitted by entities and objects indicative of temperatures. The warmer an entity or object, the more black body radiation emitted.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
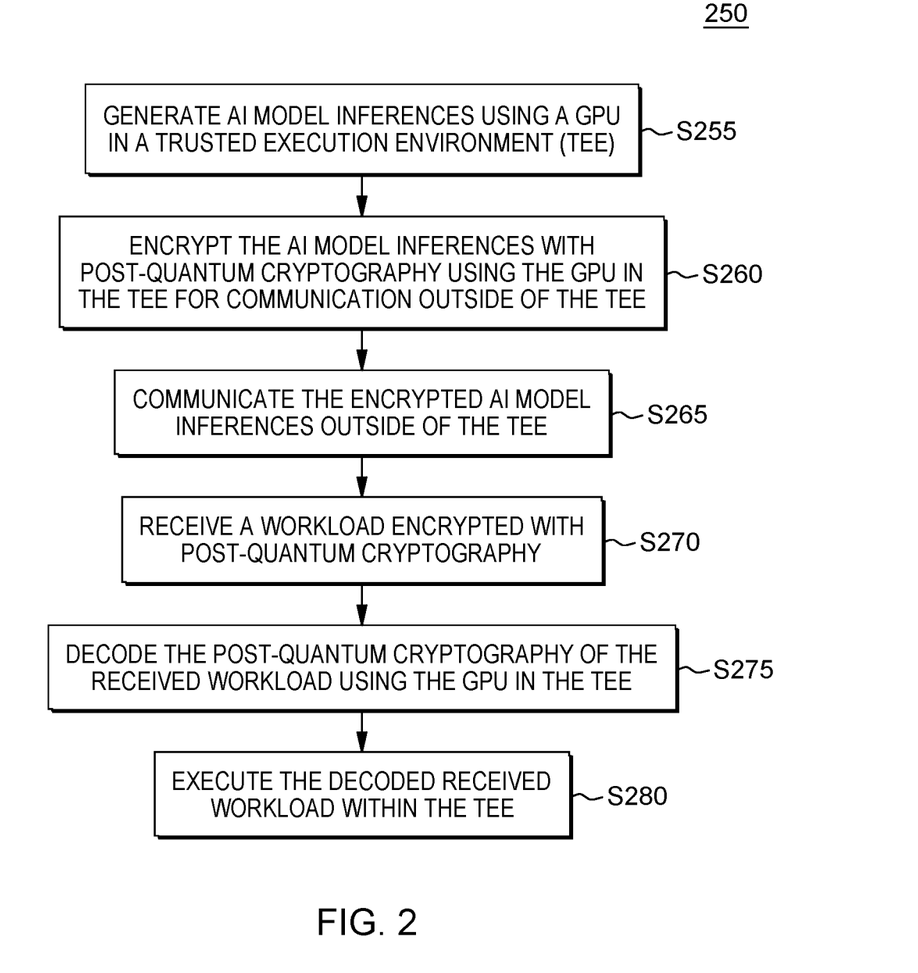
FIG. 2 is a flowchart showing a first embodiment method performed, at least in part, by the first embodiment system.
Figure 3:
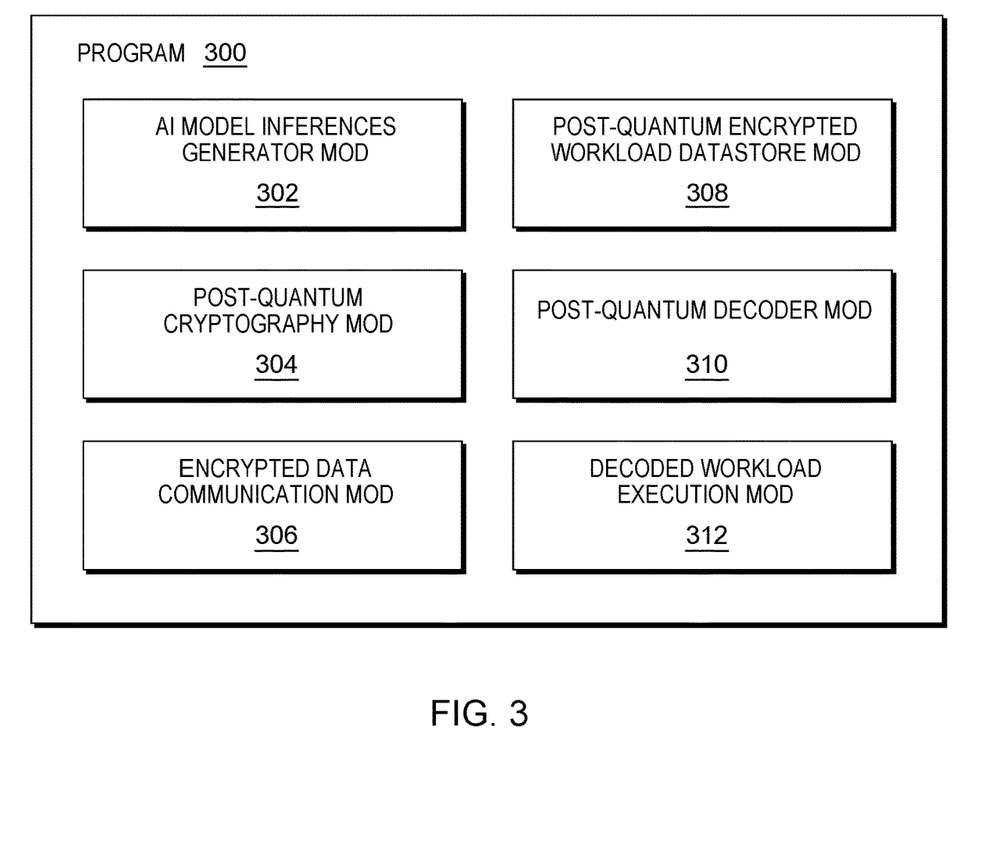
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where AI model inferences generator module ("mod") 302 generates AI model inferences using a GPU in a trusted execution environment (TEE). In this simplified embodiment, AI model inferences refers to instances where an AI model (AI model inferences generator), using sensor data from IR camera 236 of FIG. 1, determines whether a person observed by IR camera 236 has contracted COVID-19 based on dermis temperatures observed by the IR camera, where the sensor data is provided as input to AI model inferences generator mod 302. Information related to medicine and health of persons is frequently required to be handled with a high degree of confidentiality. One way to provide this confidentiality is for the processing of this data to take place within a trusted execution environment, or TEE. In this simplified embodiment, the TEE encompasses half of the computing capabilities of GPU 234, processor set 204, and memory 208. Contents from the TEE are encrypted before storage in persistent storage 210, and decrypted as they are read into the TEE.

The highly parallelized structure of GPUs, such as GPU 234, are particularly suited to performing many AI inferencing operations (as compared to more general computer processors such as processor set 204). Extending the TEE to encompass units of the GPU provides for enhanced security/confidentiality for AI inferencing operations performed by the more efficient GPU. As an example in this simplified embodiment, AI model inferences generator mod 302 generates an inference that an observed person, "Person A," has COVID-19 based on reading radiation indicating feverish temperatures over a span of ten seconds of recorded infrared imaging recorded at sixty frames per second, processing the AI model through GPU 234 within the TEE. Some alternative embodiments include different edge computing tasks, such as, but not limited to, decentralized learning of a cloud computing environment based AI.

Processing proceeds to operation S260, where post-quantum cryptography mod 304 encrypts the AI model inferences with post-quantum cryptography using the GPU in the TEE for communication outside of the TEE. In this simplified embodiment, the post quantum cryptography scheme used is lattice based cryptography, which GPUs such as GPU 234 are particularly suitable for performing the related operations. Lattice based cryptography heavily features mathematic operations involving vectors, which are calculations that GPUs are particularly designed to perform efficiently. Before information, such as previously generated AI inferences, can leave the TEE (such as to be stored locally on persistent storage 210 or communicated over network 114 to one or more clients), it must first be encrypted with lattice based encryption. In some alternative embodiments, the post-quantum cryptography scheme used is one of: (i) multivariate cryptography; (ii) hash-based cryptography; (iii) code-based cryptography; and (iv) supersingular elliptic curve isogeny cryptography. The AI model inference generated at S255, that Person A has contracted COVID-19, is encrypted using lattice-based encryption by post-quantum cryptography mod 304 using GPU 234 to perform the lattice-based encryption operations.

Processing proceeds to operation S265, where encrypted data communication mod 306 communicates the encrypted AI model inferences outside of the TEE. In this simplified embodiment, the AI model inference generated at S255, that Person A has contracted COVID-19, and encrypted at S260 with lattice based encryption by post-quantum cryptography mod 304 using GPU 234, is stored locally on persistent storage 210 and communicated to client 104 over network 114. Client 104, in this simplified embodiment, is a cloud-based computing environment hosting a training environment for refining the AI model inferencing algorithm that generated the AI model inference at S255. In some alternative embodiments, the encrypted AI model inferences are communicated to either one of: (i) a local machine readable storage device; or (ii) storage in a cloud-based computing environment.

Processing proceeds to operation S270, where post-quantum encrypted workload datastore mod 308 receives a workload encrypted with post-quantum cryptography. In this simplified embodiment, the workload is a different AI model for generating inferences from infrared video, based on observing respiration rate of individuals from identifying exhalation of air with temperatures elevated above background temperatures from the head of any identified individuals. This workload is encrypted with lattice based encryption when communicated. Workloads such as this are encrypted before they are read into cache memory of components within the TEE for active processing. In some alternative embodiments, other types of workloads are received, such as other types of AI or machine learning workloads and/or distributed learning workloads. For example, distributed learning workloads corresponding to distributed artificial intelligence are particularly suitable, as they by nature are "embarrassingly parallel" indicative of the minimal effort required to divide the problem into a number of parallel tasks (which GPUs are particularly suitable to processing efficiently compared to general purpose processors). Federated learning is another approach that would be well suited to deployment according to the embodiment techniques, where some embodiment techniques provide secure computing environments on edge devices capable of being worn or carried by individuals out performing physically rigorous activities where each edge device holds their observed data locally and communicates their inferences to a more central AI or machine learning algorithm for updating the edge algorithms based on the collective inferences. In some alternative embodiments, received workloads include cryptographic attestation that is verified using GPU 234 (or other similar SIMD accelerator units).

Processing proceeds to operation S275, where post-quantum cryptography decoder mod 310 decodes the post-quantum cryptography of the received workload using the GPU in the TEE. In this simplified embodiment, the post-quantum cryptography of the received workload is a lattice based encryption scheme, which is decoded using GPU 234 within the TEE. As the workload is read into the cache or frame buffer memory (not shown) of GPU 234, post-quantum cryptography decoder mod 310 decodes the post-quantum cryptography of the received workload using GPU 234 so that the workload can be executed in an decoded state within the security of the TEE, such that the workload is decoded within the TEE and encrypted when without.

Processing proceeds to operation S280, where decoded workload execution mod 312 executes the decoded received workload within the TEE. In this simplified embodiment, the decoded received workload corresponds to the AI model for generating inferences from infrared video, based on observing respiration rate of individuals from identifying exhalation of air with temperatures elevated above background temperatures from the head of any identified individuals. In one aspect of this AI model of the received decoded workload, a person with an elevated respiration rate corresponding to shallower breaths with shorter intervals corresponds to an AI inference of the person having COVID-19. With the workload decoded within the TEE, sub-system 102 continues to collect infrared images through IR camera 236, which is then provided as input to decoded workload execution mod 312 to execute the workload by generating inferences from the infrared images according to the above. In this simplified embodiment, a new person walks into the observation frustrum of IR camera 236, which collects a series of infrared images at a rate of sixty frames per second over the timespan of ten seconds (or 600 infrared images covering a span of ten seconds), showing several small volumes of air with temperatures elevated above background levels exiting near the head of the new person. The AI model of the decoded received workload analyzes these images as input and concludes that the new person likely has contracted COVID-19.

In some alternative embodiments, sub-system 102 includes anti-tampering hardware elements (not shown) to discourage or inhibit physical tampering with sub-system 102. In yet further alternative embodiments, the trusted execution environment and post-quantum encryption/decoding powered by the GPU within the trusted execution environment provide opaque execution as to what is performed on the device. In further alternative embodiments, where either data or information is encrypted and communicated out of the TEE or workloads or information is received (but not decoded due to faulty cryptographic attestation on the information received), a threshold-based retry/retransmit module attempts to retry the communication and evaluates the faulty or failed communications for rates to exceed expected levels of damaged or faulty packets in wireless communications corresponding to tampering or unintended/undesired third parties attempting to intercept or inject communications from or to the TEE.

III. Further Comments and/or Embodiments

Some embodiments of the present invention recognize the following facts, potential problems and/or potential areas for improvement with respect to the current state of the art: (i) Trusted Execution Environments (TEEs) today are limited to CPUs, but work is already being performed to extend the trust boundary of these environments to include off-CPU accelerators; (ii) Internet of Things (IoT) devices in the next few years are expected to have GPU acceleration capabilities for edge inferencing and distributed machine learning; (iii) for example using Federated Learning; (iv) such devices also already have crude Trusted Execution Environments (e.g. ARM® TrustZone®), but with very limited capabilities compared to a full server CPU such as an Intel® Xeon® with SGX; (v) current TEEs typically use Elliptic Curve cryptography or similar techniques that are not considered "Quantum Safe," or resistant to future decryption through Quantum Computing techniques such as Shor's Algorithm; and (vi) battlefield wireless communications gear used for classified communications have stringent encryption requirements, and include tactical mechanisms to enable the device to be destroyed or rendered useless if captured by an enemy (see for example a "Clipper Chip").

Some embodiments of the present invention may include one, or more, of the following operations, features, characteristics and/or advantages: (i) a processor design for highly secure field analytics including AI inferencing and decentralized learning; (ii) with sufficiently robust security to be suitable for future battlefield wireless edge computation and similarly sensitive operations; (iii) the device is based on a combination of technologies including: (a) lattice encryption, and (b) Trusted Execution Environments with extended trust boundaries encompassing hardware acceleration such as GPU; (iv) a system and method of creating a highly secure IoT/Edge Computing Trusted Execution Environment that is capable of algorithmic agility; (v) including the ability to support quantum-safe Lattice Cryptography; (vi) the device on which this capability will run is comparable to an ARM® CPU, but with a more advanced TEE comparable to Intel® SGX, AMD® SEV, or Power® SMF, with cryptographic attestation for integrity assurance; (vii) the device in question also includes GPU-like SIMD execution units in order to support AI/ML inferencing; (viii) optionally also distributed learning, such as is possible using Federated Learning and similar techniques; (ix) the "Trust Boundary" of the CPU is extended to include the GPU or other accelerator; (x) the resulting computing environment enables the deployment of many different possible "edge analytics" to the IoT device in a way that enables various protections, even to a level beyond what military-grade hardware provides today, in that such gear does not currently support Quantum-Safe Lattice Encryption; (xi) these protections include: (a) always-encrypted ML/AI Models, and (b) data; (xii) in such environments, the code and data remain encrypted in memory and/or storage, as well as when transmitted across the network; (xiii) they are only decrypted as they are read into the CPU/GPU cache and execution units; (xiv) for this reason, it is also desirable to include physical tamper-resistance features in the physical chip package such as are in common use today in Hardware Security Modules; (xv) single instruction, multiple data (SIMD) is a class of parallel computers in Flynn's taxonomy that describes computers with multiple processing elements which perform the same operation on multiple data points simultaneously; (xvi) such computers exploit data level parallelism, but not concurrency; and (xvii) that is, there are a plurality of simultaneous (or parallel) computations, but only a single process (or instruction) at a given point in time.

Some embodiments of the present invention may include one, or more, of the following operations, features, characteristics and/or advantages: (i) cryptographic integrity and tamper-resistance; (ii) the TEE would operate on the principle of white-list execution only; (iii) that is, any workload deployed to it would have a cryptographic attestation performed as a part of the deployment process, and only workloads whose hash was signed by the appropriate authority would be executed; (iv) this assures that not a single bit of the workload—data or program/model—had been changed since it was signed by the authority; (v) opaque execution—by virtue of the encryption and deployment model, appropriate authorities could even deploy analytics to the edge device without the user (e.g. Infantry soldier) knowing or being able to discern what task the device was performing; (vi) this is an optional feature; (vii) consumer versions of the device would more likely expose the identity of any analytic for the user to approve; (viii) resilience—in case any model or data fails to pass the attestation hash and signature test, or the results returned from the edge device to the authorities managing the analytics fail in their similar integrity tests, the system would include retry/retransmit mechanisms; (ix) with threshold error reporting to indicate when there is likelihood of deliberate tampering beyond what normal wireless systems experience as damaged packets; (x) an additional advantage of the disclosed system lies in the fact that GPU and similar SIMD execution units are particularly well suited to the acceleration not only of AI workloads, but of the Lattice Cryptography itself; (xi) this makes the accelerated processor an ideal environment for this; (xii) the very high parallelism in GPUs and their fast execution of vector and matrix/tensor math makes them ideally suited to performing lattice encryption calculations; (xiii) a Trusted Execution Environment need not look much different from existing ones in terms of structure and functionality other than it includes GPU or similar SIMD highly-parallel execution units in it capable of doing fast tensor math and it uses that to perform its lattice-based cryptography (as well as other confidential work such as Deep Neural Net training and inferencing); (xiv) these accelerators work well on lattice cryptography because lattice cryptography is unbelievably heavy on repetitive math operations which are not particularly difficult to parallelize and perform in the form of matrices/tensors; and (xv) many types of lattice cryptography can be thus accelerated.

Some embodiments of the present invention may include one, or more, of the following operations, features, characteristics and/or advantages: (i) for very-high-security situations such as those found on a battlefield, there has traditionally been a requirement that secure communication devices and other sensitive technology be able to be destroyed or rendered useless on short notice in case of imminent risk of capture; (ii) the current technology can meet this requirement in a virtual, software-based sense by the simple expedient of having a local or remote workload deletion feature; (iii) any workload can be deleted and its contents quickly overwritten in memory, optionally using a capacitor or battery power backup to ensure overwriting if power is withdrawn; (iv) another embodiment of this invention is an edge AI inferencing device in a regulated industry that is monitoring quality assurance in an environment such as a manufacturing or lab facilities; (v) in this embodiment, the regulating body may supply the signed AI inferencing workload to the regulated party; (vi) using an embodiment as described here, the regulator can ensure the AI inferencing model is not tampered with on the device located in the regulated lab or manufacturing facility; (vii) combination of the trusted execution environment and lattice encryption ensures that the workload cannot be introspected or otherwise tampered with while executing or while at rest on the device; and (viii) lattice encrypted specific trusted execution environments.

Figure 4:
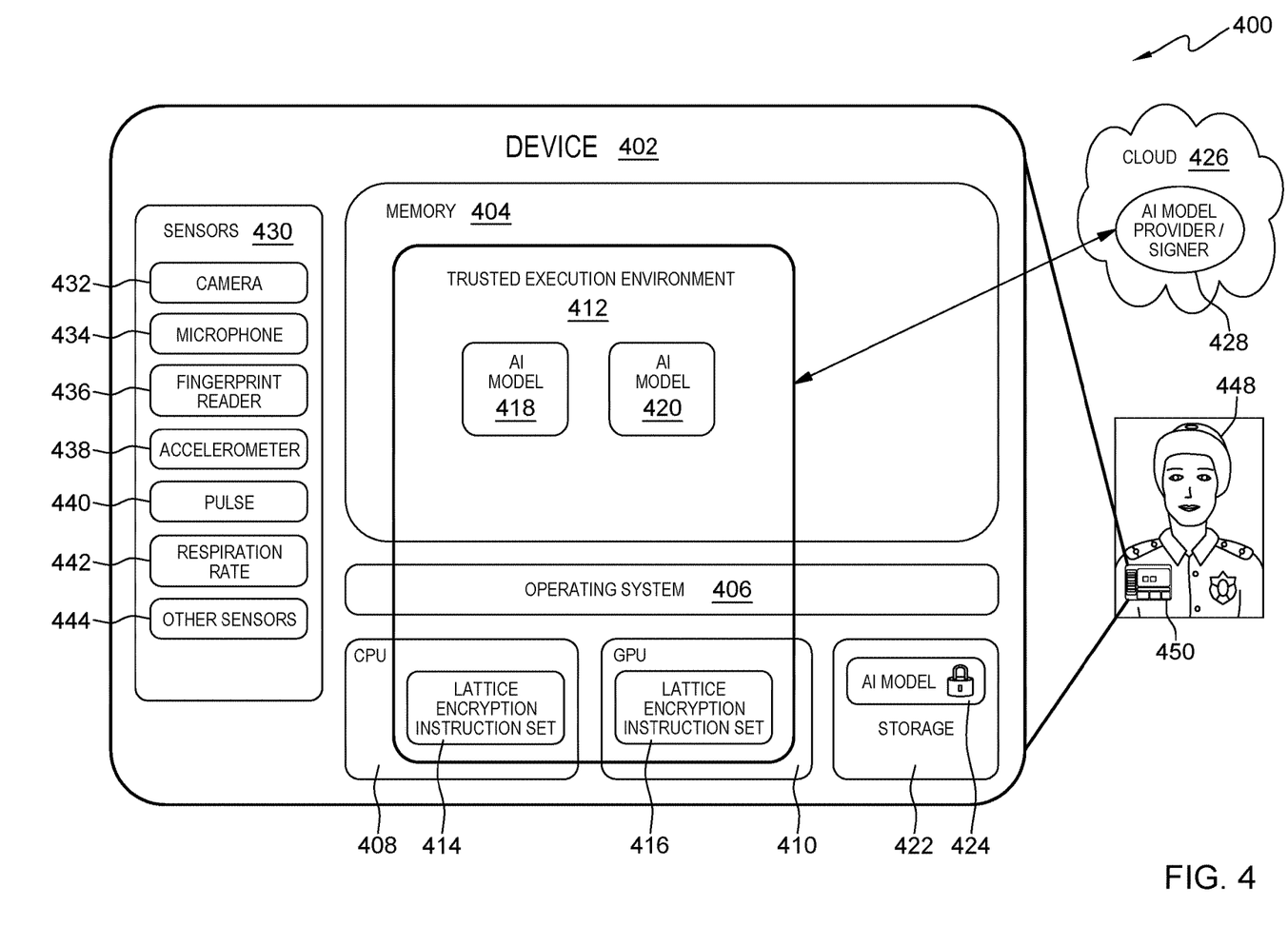
FIG. 4 is a block diagram view of a second embodiment system.

Block diagram 400 of FIG. 4 shows an edge AI inferencing device according to a second embodiment of the present invention, and includes: (i) device 402; (ii) random access memory 404; (iii) operating system 406; (iv) CPU 408; (v) GPU 410; (vi) trusted execution environment 412; (vii) CPU lattice encryption instruction set 414; (viii) GPU lattice encryption instruction set 416; (ix) AI model 418; (x) AI model 420; (x) storage memory 422; (xi) encrypted AI model 424; (xii) cloud computing environment 426; (xiii) AI model provider/signer 428; (xiv) sensor set 430; (xv) camera 432; (xvi) microphone 434; (xvii) fingerprint reader 436; (xviii) accelerometer 438; (xix) heart rate pulse sensor 440; (xx) respiration rate sensor 442; and (xxi) other sensor(s) 444. Trusted execution environment 412 encompasses some portions of memory 404 as well as some execution units of CPU 408 and GPU 410. AI models 418 and 420 are read into memory 404 within trusted execution environment 412 and executed by CPU 408 and GPU 410. Data created as a result of execution of AI models 418 and 420, or other AI models such as AI model 424, are stored in local storage memory 422 in an encrypted format (for example, encrypted with lattice based cryptography), encrypted with lattice encryption instruction sets 414 and 416. When read back within trusted execution environment 412, GPU 410 and CPU 408 decode the encryption with lattice encryption instruction sets 414 and 416. Device 402 might be a small form factor edge computing device, such as device 450 worn on an individual person, such as an infantry soldier or other security personnel 448.

Some embodiments of the present invention are directed towards a computing device comprising: (i) a Trusted Execution Environment (TEE); and a (ii) GPU (or other accelerator) within the TEE, wherein the GPU's built-in parallelization/acceleration is used to perform Lattice Cryptography operations necessary to make it quantum-safe.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

Inferencing: stages in reasoning, moving from premises to logical consequences. Inferencing is traditionally divided into deduction and induction. Deduction is inference deriving logical conclusions from premises known or assumed to be true, with the laws of valid inference studied in logic. Induction describes inference from particular premises to a universal conclusion. Several fields study how inference is done in practice. Human inference (for example, how humans draw conclusions) is traditionally studied within the fields of logic, argumentation studies, and cognitive psychology; researchers in AI develop automated inference systems to emulate human inference.

What is claimed is:

1. A computer-implemented method (CIM) for use with an edge computing device including a trusted execution environment, the CIM comprising:
   verifying a cryptographic attestation of a workload signed by a previously designated external source, wherein the workload is encrypted with a post-quantum encryption scheme;
   responsive to a verified cryptographic attestation, reading the workload encrypted with the post-quantum encryption scheme into the trusted execution environment, wherein the trusted execution environment has an extended trust boundary encompassing one or more graphics processing units (GPUs), and wherein reading the workload into the trusted execution environment includes:
      decoding, using the one or more GPUs, the workload encrypted with the post-quantum encryption scheme as the workload is read into machine readable storage of the one or more GPUS;
   executing, using the one or more GPUs, the decoded workload to generate a data record for encryption, wherein executing the decoded workload to generate the data record for encryption includes generating one or more machine learning inferences using an algorithm executed by the one or more GPUs within the extended trust boundary of the trusted execution environment; and
   encrypting, using the one or more GPUs, the data record with the post-quantum encryption scheme.

2. The CIM of claim 1, wherein the post-quantum encryption scheme is lattice-based encryption.

3. The CIM of claim 1, further comprising: communicating the encrypted data record to one or more cloud-based computing environment computers over a computer network.

4. The CIM of claim 1, further comprising: communicating the encrypted data record to a storage memory module of the edge computing device where the storage memory module is excluded from the trusted execution environment.

5. A computer program product (CPP) for use with an edge computing device including a trusted execution environment, the CPP comprising:
   a machine readable storage device; and
   program instructions stored on the machine readable storage device to perform operations comprising:
      verifying a cryptographic attestation of a workload signed by a previously designated external source, wherein the workload is encrypted with a post-quantum encryption scheme;
      responsive to a verified cryptographic attestation, reading the workload encrypted with the post-quantum encryption scheme into the trusted execution environment, wherein the trusted execution environment has an extended trust boundary encompassing one or more graphics processing units (GPUs), and wherein reading the workload into the trusted execution environment includes:
         decoding, using the one or more units GPUs, the workload encrypted with the post-quantum encryption scheme as the workload is read into machine readable storage of the one or more units GPUs;
      executing, using the one or more units GPUs, the decoded workload to generate a data record for encryption, wherein executing the decoded workload to generate the data record for encryption includes generating one or more machine learning inferences using an algorithm executed by the one or more GPUs within the extended trust boundary of the trusted execution environment; and encrypting, using the one or more units GPUs, the data record with the post-quantum encryption scheme.

6. The CPP of claim 5, wherein the post-quantum encryption scheme is lattice-based encryption.

7. The CPP of claim 5, wherein the operations further comprise: communicating the encrypted data record to one or more cloud-based computing environment computers over a computer network.

8. The CPP of claim 5, wherein the operations further comprise: communicating the encrypted data record to a storage memory module of the edge computing device where the storage memory module is excluded from the trusted execution environment.

9. An edge computing device computer system (CS) comprising:
a processor set, wherein the processor set includes one or more graphical processing units;
a trusted execution environment having an extended trust boundary encompassing the one or more GPUs;
a machine readable storage device; and
program instructions stored on the machine readable storage device to cause the processor set to perform operations comprising:
verifying a cryptographic attestation of a workload signed by a previously designated external source, wherein the workload is encrypted with a post-quantum encryption scheme;
responsive to a verified cryptographic attestation, reading the workload encrypted with the post-quantum encryption scheme into the trusted execution environment, wherein reading the workload into the trusted execution environment includes:
decoding, using the one or more GPUs, the workload encrypted with the post-quantum encryption scheme as the workload is read into machine readable storage of the one or more GPUs;
executing, using the one or more GPU's, the decoded workload to generate a data record for encryption, wherein executing the decoded workload to generate the data record for encryption includes generating one or more machine learning inferences using an algorithm executed by the one or more GPUs within the extended trust boundary of the trusted execution environment; and
encrypting, using the one or more units GPUs, the data record with the post-quantum encryption scheme.

10. The CS of claim 9, wherein the post-quantum encryption scheme is lattice-based encryption.

11. The CS of claim 9, wherein the operations further comprise: communicating the encrypted data record to one or more cloud-based computing environment computers over a computer network.

12. The CS of claim 9, wherein the operations further comprise: communicating the encrypted data record to a storage memory module of the edge computing device where the storage memory module is excluded from the trusted execution environment.

* * * * *